US005609836A

United States Patent [19]
McManus et al.

[11] Patent Number: 5,609,836
[45] Date of Patent: Mar. 11, 1997

[54] DCR TRANSPORTABLE TREATMENT UNIT

[75] Inventors: Richard W. McManus, Woodland; Alfonso Lugo, South San Francisco; Michael C. Ellinger, San Rafael, all of Calif.

[73] Assignee: Sound Environmental Services, Inc., Woodland, Calif.

[21] Appl. No.: 337,664

[22] Filed: Nov. 9, 1994

[51] Int. Cl.[6] .................................................. C02F 11/14
[52] U.S. Cl. ........................ 422/233; 210/170; 210/180; 210/188; 210/205; 405/128; 405/263
[58] Field of Search ................................ 210/198.1, 751, 210/175, 180, 188, 170, 205, 206; 422/233; 405/128, 263

[56] References Cited

U.S. PATENT DOCUMENTS

| 4,981,600 | 1/1991 | Tobler et al. ........................... 210/751 |
|---|---|---|
| 5,037,560 | 8/1991 | Gayman .................................. 210/751 |
| 5,051,031 | 9/1991 | Schumacher et al. .................. 210/751 |
| 5,186,840 | 2/1993 | Christy et al. .......................... 210/751 |
| 5,217,624 | 6/1993 | Yamane et la. ......................... 210/751 |
| 5,229,011 | 7/1993 | Christy, Sr. et al. .................... 210/751 |
| 5,259,977 | 11/1993 | Girovich et al. ....................... 210/751 |
| 5,277,825 | 1/1994 | Tobler et al. ............................ 210/751 |
| 5,419,839 | 5/1995 | Haley et al. ............................. 210/751 |
| 5,435,923 | 7/1995 | Girovich ................................. 210/751 |

*Primary Examiner*—Neil McCarthy
*Attorney, Agent, or Firm*—Price, Gess & Ubell

[57] ABSTRACT

The present invention relates generally to a method and device to treat and remediate contaminated soils and sludges and, in particular, relates to a treatment unit which is transportable, quickly mobilized, and capable of remediating large quantities of waste by exothermic stabilization processes such as the calcium oxide based DCR process.

20 Claims, 7 Drawing Sheets

FROM FIG.6a

↓

┌─────────────────────────────────────────────┐ ─7
│ THE WASTE COMPARTMENT OF WEIGH HOPPER 2 STARTS │
│ TO FILL (Aprox. 66 Sec.) THE LIME COMPARTMENT │
│ OF HOPPER 2 CONTINUES TO BE FILLED, WITH │
│ APPROXIMATLY 40 SECONDS TO COMPLETION. WHEN │
│ THE WASTE COMPARTMENT OF WEIGH HOPPER 2 IS │
│ FILLED, THE PLC RE-DIVERTS THE MATERIAL FEED │
│ CONVEYOR TO WEIGH HOPPER 1. │
│                                                │
│ NOTE: HOPPER 2 DISCHARGES TO MIXER 2. │
└─────────────────────────────────────────────┘

↓

┌─────────────────────────────────────────────┐ ─8
│ THE FILLING CYCLE CONTINUES UNLESS INTERRUPTED. │
│ THIS SEQUENCING PROVIDES FOR COMPLETION OF THE │
│ LIME FILL APPROXIMATELY 26 SECONDS AHEAD OF THE │
│ WASTE FILL. THIS ALLOWS THE WASTE FILLTO WEIGH │
│ OUT LAST-MEETING THE SELECTED WASTE TO LIME RATIO. │
└─────────────────────────────────────────────┘

DCR TRANSPORTABLE TREATMENT UNIT

BACKGROUND OF THE INVENTION

1. Field of the Invention

The present invention relates generally to a method and device to treat and remediate contaminated soils and sludges and, in particular, relates to a treatment unit which is transportable, quickly mobilized, and capable of remediating large quantities of waste by exothermic stabilization processes such as the calcium oxide based DCR process.

2. Description of Related Art

The present invention is a Transportable Treatment Unit (TTU) designed to efficiently treat large volumes of heavily contaminated soils and sludges using exothermic stabilization processes, such as the calcium oxide based Dispersion by Chemical Reaction (DCR) process. The DCR process is an adsorptive process utilizing the increasing specific surface area available for adsorption during calcium oxide hydration reactions. DCR has applications for the stabilization of organic wastes, or mixtures of inorganic materials and hydrocarbons. In general, the oil is carried through the exothermic hydration reaction and is adsorbed homogeneously throughout the hydroxide. The oil is eliminated from the oily phase by virtue of being adsorbed onto the hydroxide in molecular thicknesses across a dramatically increased surface area. Specifically, DCR utilizes certain chemical compounds such as quicklime which, upon reacting with water, form solids wherein the specific surface area increases dramatically, over 30-fold, in what is termed a dispersing reaction. The DCR process, and some laboratory approaches used to predistribute the material, are described in U.S. Pat. Nos. 4,018,679, 4,350,598, and 4,448,971.

With a DCR process, oils and oily substances are converted from mobile liquid materials into pulverulent materials by taking advantage of these dispersing reactions. However, this is only possible by evenly predistributing the oily material in the quicklime prior to affecting the hydration reaction. The predistribution has not been achievable on a large and efficient scale to date.

In the prior art, the majority of treatment units used for waste stabilization are flow through pug mills. However, there is a number of deficiencies and problems in the prior art for waste stabilization. Pug mill units provide for mixing in low RPM (<40 rpm) pug mill mixers where waste, reagent, and water are loaded in one end of the mixer and discharged through the other after mixing for 10 to 40 seconds. These systems work well when mixing granular soils with cement reagents. However, these systems do not work well when mixing cohesive materials such as tarry contaminated wastes or clay contaminated matrices.

The minimal mixer residence time and low mixer rpm frequently result in poor mixing using these systems. In addition, the flow through system requires all mix components be added in the load end of the mixer and does not provide for waste conditioning or premixing with water prior to addition of reagent. This flow through system also does not provide for much flexibility in extending mix times, as may be required to treat certain cohesive wastes.

Further, pug mill systems used in the waste treatment industry are open systems and do not provide for dust and/or volatile emissions containment. These systems are particularly poorly suited for treatment processes involving exothermic hydration reactions, such as calcium oxide-based processes. These processes rapidly heat treated waste and evolve volatile emissions. Frequently, alternative and more expensive treatment processes are chosen over calcium oxide-based processes because available treatment equipment lacks emissions containment systems.

Another problem with most pug mill systems is that they are fed by belt feeders with shear gate modulating systems. These systems are frequently blocked by debris in waste. Also, these systems frequently pass rock, concrete, and metal debris into mixers that can damage mixer components.

Another problem area with the prior art is that standard weigh batch hoppers receive both reagent and waste. This allows interaction between waste and reagent prior to discharge into mixers. This is a problem with highly reactive reagents, such as calcium oxide. Interaction between waste and reagent prior to mixing can result in wasted reagent with these systems.

Standard hopper systems only provide for simultaneous discharge of waste and reagent into mixers, preventing any preconditioning of waste in mixer prior to discharge of reagent.

Still another disadvantage associated with the prior art system is the use of a single mixer system. Single mixer systems, batch and continuous, suffer total shutdown when mixer operation is interrupted for maintenance or repair. This negatively impacts system economics because all treatment operations must cease until equipment is returned to operation. Dual train operation provides for continued treatment on one mixer system, while repairs are made to the other. This provides for continued utilization of project assets while repairs are made or maintenance is performed.

Generally batch treatment can provide for user control of the mixing cycle (i.e., mix time, waste conditioning with water prior to reagent addition, sequential addition of reagent and water, etc.). However, attempts to utilize a batch treatment program with the prior art single mixer system generally have reduced overall waste treatment rates due to extended cycle times.

SUMMARY OF THE INVENTION

The present invention is a Transportable Treatment Unit (TTU) designed to treat contaminated soils and sludges using exothermic processes. One such exothermic process is the DCR process which generally utilizes calcium oxide (lime). However, other exothermic processes may utilize reagents such as kiln dust, dolomitic lime, or magnalime. For the purposes of the following discussion the DCR process is used for illustration purposes, not to limit the scope of use or to exclude the use of other process, since the generic principles of the present invention have wide application.

Because of the inherent unknowns in waste remediation, it is desirable to have a treatment unit which has a high degree of operational flexibility and is designed and sized to maximize throughput. The TTU of the present invention contains such a degree of operational flexibility.

The TTU of the present invention is transportable with all equipment being trailer-mounted for ease of transport. As such, the TTU is easily utilized over several remediation projects. Being transportable also means the equipment is quickly mobilized and erected on site, using a minimum of permanent structures.

The TTU of the present invention has parallel treatment capability in that it is built with parallel material processor units—weigh batch hoppers, mixers, and conveyers. Normally, both units operate concurrently during a single shift.

During prolonged repairs to one treatment processor, the other can be operated with double shifts and to achieve treatment production. Disregarding repairs and other upsets, the incremental capital cost of parallel trains is offset by reduced labor.

The core of the TTU is its dual material processor units. These units operate in parallel, in a batch sequencing fashion. Each unit comprises a weigh batch hopper, a high intensity shear mixer, and an enclosed walking floor conveyer. In essence, the material processor units control the reagent/waste ratios, mixes the reagent with the waste, and controls emissions during the hydration process. Both units share a common headwork that crushes and breaks the material before feeding it at a controlled rate to the weigh batch hoppers. Also, both units discharge to a common conveyer system, which stacks the treated waste in a stockpile. By design, either material processor unit may operate separately in the event the other is down for maintenance.

An important component of the TTU is its emissions control equipment, which captures fugitive dust and organic emissions. The emissions control equipment comprises of a combination of filters and a hydrostatic precipitator for dust control, and a spray tower and activated carbon for organic emissions control. However, these components can vary dependant upon the makeup of emissions.

All of the equipment is trailer-mounted and transportable. With the exception of the emissions control equipment, all equipment is designed to remain trailer-mounted when it is mobilized in the field. The emissions control system has a small footprint and may be set on two pads in the treatment area. All equipment is field-erected with a small crane.

When implementing the DCR process the TTU utilizes three processes to insure that the waste material is efficiently predistributed into the quicklime prior to hydration. The first process is that acidic oily waste is neutralized with a lime slurry (calcium hydroxide) prior to excavation. As a result, salts (e.g., calcium sulfate) are formed in situ in the waste during the neutralization process. These salts, to some extent, retard the hydration reaction. The second process is a means by which the lime is hydrophobized. This is accomplished by spraying the quicklime with a hydrophobizing agent to delay hydration from occurring until sufficient mixing is achieved to predistribute the oil throughout the calcium oxide. Specifically, the TTU hydrophobizes the quicklime as it is blown from storage silos to the TTU's lime day tank. The third process is means to rapidly mix the quicklime and oily sludge. In the TTU unit, high intensity shear mixers flash mix the quicklime and oily sludge in approximately 30 seconds. In many instances, this process alone is sufficient to predistribute the oil throughout the calcium oxide before hydration begins. Other treatment methods utilize these same processes in accomplishing treatment.

As a result of the present invention numerous advantages are achieved. For example, problems with flow through pug mills are eliminated by use of TTU batch system which utilize a high shear mixer. As a result, the present invention works well with granular soils and even cohesive materials such as tarry contaminated wastes or clay contaminated matrices. The TTU provides for much flexibility in extending mix times by using batch mixers modified with variable speed drives. The variable speed drives are set to nominally operate at 75 rpm (twice the normal rate). This provides for operational flexibility to determine the best rpm for mixing specific wastes.

Further, the present invention, eliminates problems in the prior art associated with treatment processes involving exothermic hydration reactions. The TTU provides for dust and/or volatile emissions containment by use of enclosed walking floor discharge system with emissions control equipment. As a result the TTU provides for an economical alternative to the more expensive treatment processes currently used for calcium oxide-based processes.

Further, the present invention reduces or eliminates the blockage and debris problems associated with the standard belt conveyor feed systems in the prior art. The feeder system of the present invention utilizes a breaker-feeder which reduces rock and concrete debris to a maximum dimension of 2.5 inches. Metal passage problem eliminated by metal detector 36 linked to plow gates 38 and bypass system.

Still further, the present invention reduces or eliminates the problems associated with the weigh batch hoppers currently used in the prior art. The TTU of the present invention uses a split hopper system with independently controlled gates. This prevents interaction of waste and reagent and provides for independent discharge of waste and reagent.

Another advantage of the present invention, is that it provides for a dual train batch system thus reducing or eliminating the disadvantages associated with a single train flow through system. The present invention provides for batch treatment without the normally associated reduction of overall waste treatment rates due to extended cycle times. In the TTU, throughput is improved by using two parallel batch mixing systems connected to one head works, one reagent feeder system, and one discharge conveyor. The two batch mixer systems can be operated in sequencing batch mode. Properly integrated into the feed system, dual batch treatment units can provide for continuous feed and system discharge. The overall system performance is about doubled with marginal additional cost (additional mixer system only). Further, dual train operation provides for continued treatment on one mixer system, while repairs are made to the other. This provides for continued utilization of project assets while repairs are made or maintenance is performed. As a result, waste treatment project economics are substantial enhanced.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 5 is a side view of the day tank;

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically.

Figure 1:
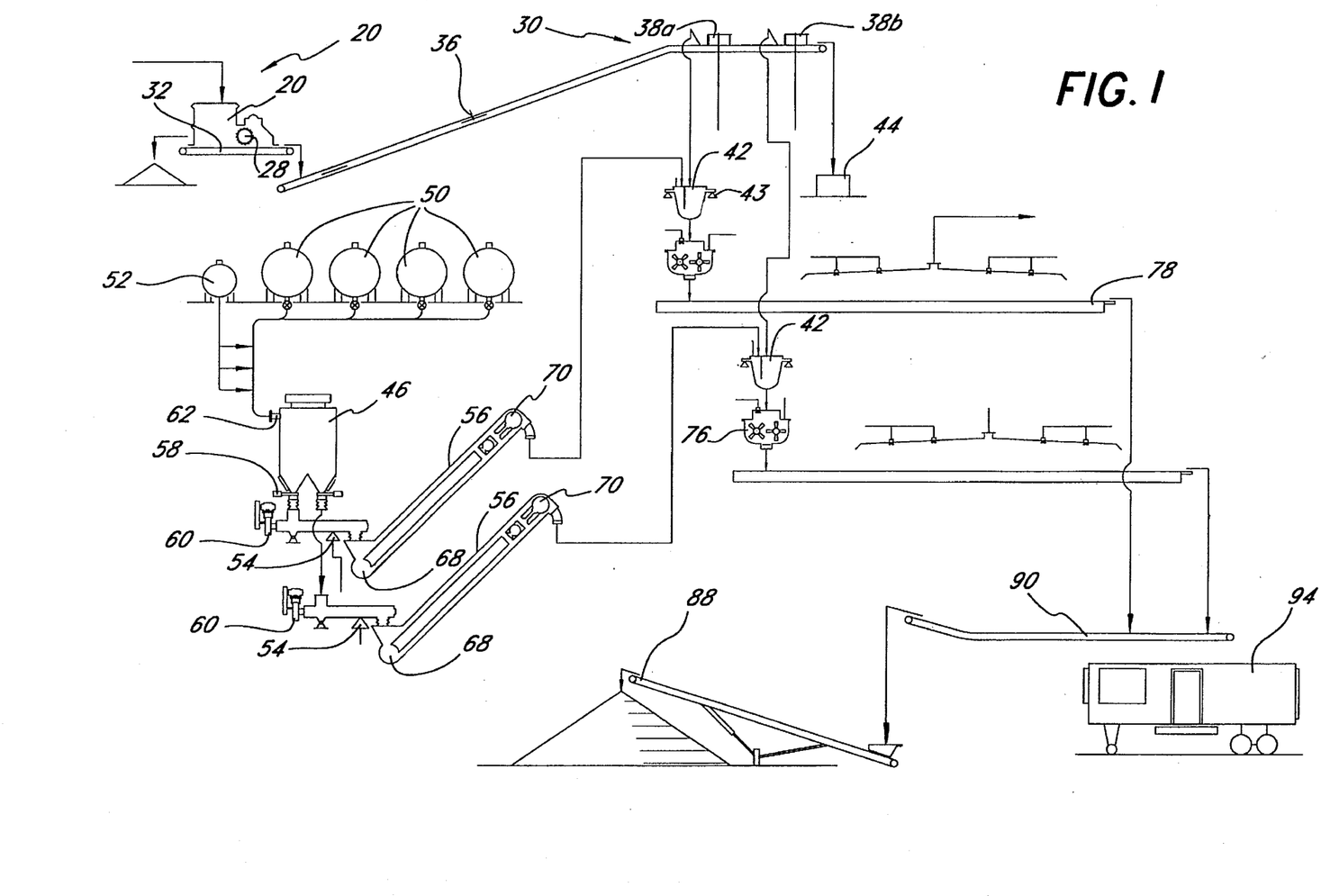
FIG. 1 is a schematic showing the equipment components and the process flow in the presently preferred embodiment.
Figure 2:
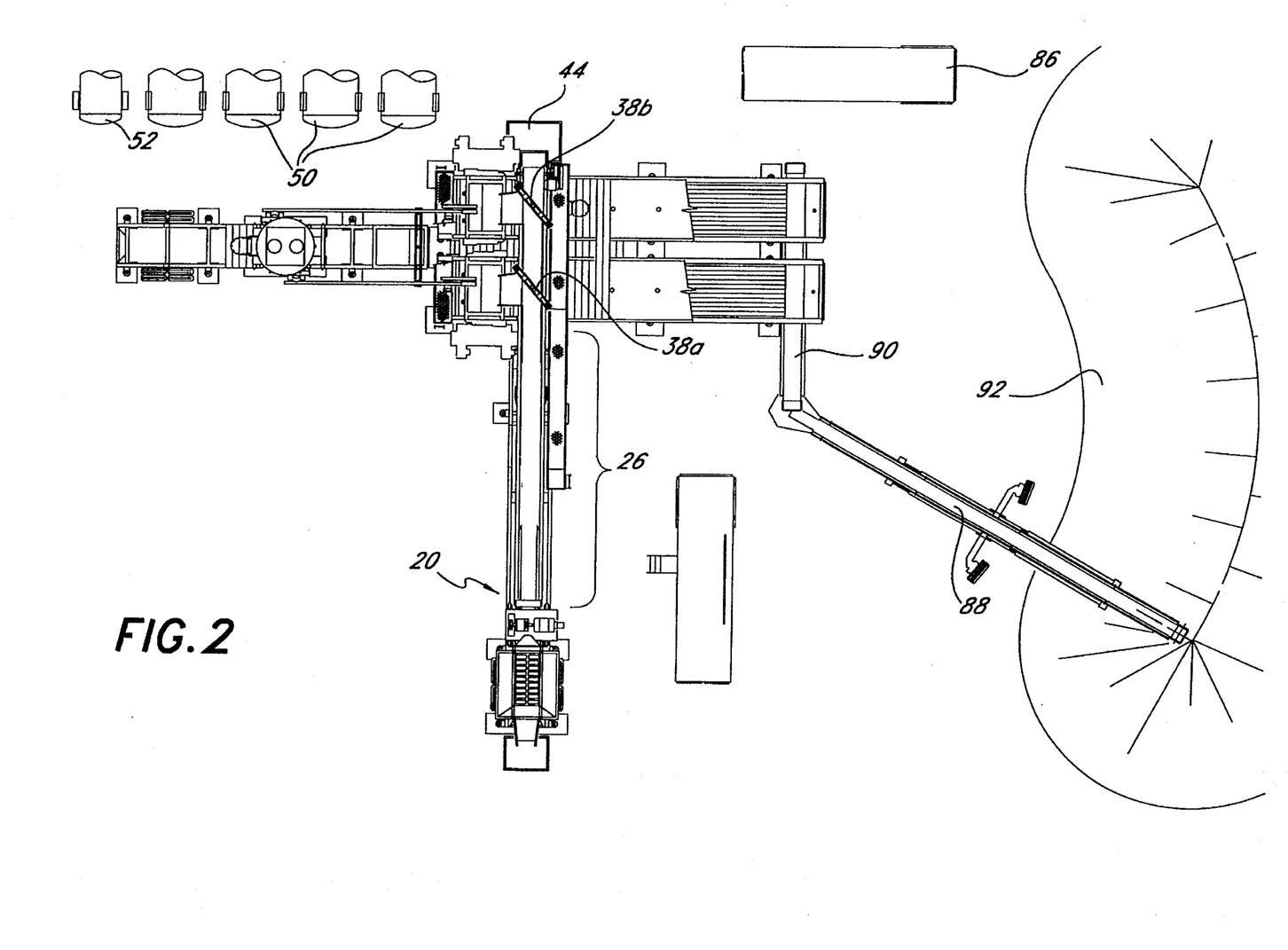
FIG. 2 is a top view of the general equipment layout in the presently preferred embodiment.

The following disclosure describes the treatment process, including the major TTU components. The discussion follows the process flow, beginning with the plant's headwork and ending with the discharge and stacking of the treated material. The discussion corresponds to the schematic showing the equipment components and the process flow in FIG. 1 and the general equipment layout shown in FIG. 2.

HEADWORK-PORTABLE MATERIAL FEEDER

At the headwork of the TTU is the portable material feeder 20. The unit comprises a feeder-breaker 22 and a material conveyor system. The headwork, common to both material processor units, feeds two parallel weigh batch hoppers 42a and 42b.

The feeder-breaker 22 reduces the raw waste to nominal 2.5 inches minus material. The feeder-breaker 22 eliminates the need for fine screening, and handling and crushing oversized material, while protecting the mixers. Its basic components are a load hopper 24, feed load conveyer 26, and breaker.

The material feeder 20 is designed to provide the following functions, (1) modulate material feed, (2) crush agglomerated material, (3) crush oversized debris, (4) detect and reject metal debris passing feeder-breaker 22, and (5) sequentially load two weigh batch hoppers 42.

Figure 3A:
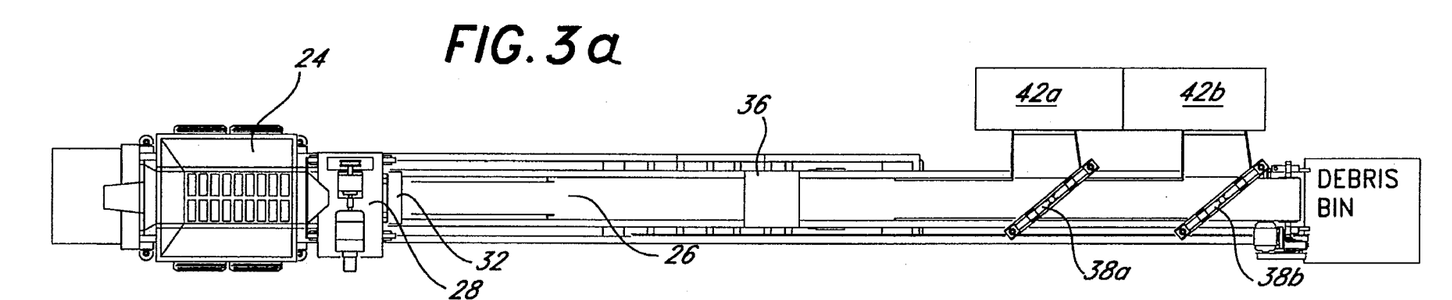
FIG. 3a is a side view of the material feeder and the material processor in the presently preferred embodiment.

To accomplish these functions a feeder breaker 22 and 36-inch belt feed load conveyor 26 have been placed on a single trailer unit. The trailer is configured as shown in FIG. 3a. The design of the feeder breaker 22 and feed load conveyor 26 is described in detailed below.

Feeder-Breaker

It is desirable that the maximum particle size for material delivered to each mixer be less than 4 inches. Due to the nature of working with waste materials it is anticipated that debris in excess of the desired 4 inch maximum dimension will reach the TTU.

To eliminate the need for fine screening (4 inches minus), handling and crushing screened overs; to assure uninterrupted high rates of production; and, to assure protection of mixing equipment from grossly oversized debris, a feeder-breaker 22 is utilized in the feed system.

A feeder-breaker 22 of the present invention performs a number of functions including; (1) modulating the feed into the sequencing batch system so as to provide for continuous feed, (2) breaking up agglomerated waste to a 2.5 inches minus nominal dimension, (3) breaking up solid debris, such as brick and rock, to a 2.5 inches minus nominal dimension, (4) providing robust and continuous operation, (5) providing easy and rapid clearing when non-crushable material is loaded into the unit.

As shown in FIG. 3, during operation, material is fed into the load hopper 24 with an excavator. The load hopper sides are preferably lined with ultra-high molecular weight (UHMW) plastic liner material to prevent sticking and bridging. Once loaded, the material falls onto a chain conveyor 32 which draws it into the rotary pick breaker 28. The chain conveyor 32 is operated by a variable speed hydraulic drive powered by the electric motor 34 that also drives the rotary breaker 28. The variable speed chain conveyor 32 draws the feed through the rotary pick breaker 28 at a rate controlled for continuous loading of the sequencing load hoppers 24.

As material is drawn into the rotary pick breaker 28, it is impacted by carbide breaker teeth. The rotary pick breaker 28 operates at a higher speed than the chain conveyor 32, thus crushing and reducing the size of material as it is drawn past. The rotary pick breaker 28 preferably exerts a minimum impact force of 10,000 psi on each pick point—easily capable of breaking concrete debris. The rotary pick breaker 28 is equipped with pick clearing teeth on the discharge side of the unit. These clearing teeth are designed to remove material from between the teeth as they rotate. Cleaned material falls onto the feed load conveyor 26. Preferably the average discharge rate is 180 cubic yards per hour, with a material density which varies from a low of 60 lb/cubic foot to a high of 126 lb/cubic foot.

It is possible that normal operations may be interrupted by unbreakable oversized material reaching the rotary pick breaker 28. This unbreakable oversized material may or may not jam the breaker thus stopping rotation. Should unbreakable oversized material reach the rotary pick breaker 28, and the oversized material is of a configuration that does not jam the rotary pick breaker 28, feed through the unit will be diminished. When this occurs operations are temporarily halted and a rear hinged access door 40 is opened, the chain conveyor 32 is reversed and the loading hopper 24 is cleared. The estimated downtime in this scenario is 10 minutes.

However, should unbreakable oversized material reach the rotary pick breaker 28 and jam the breaker stopping rotation, a shear pin will break. The failure of the shear pin frees the rotation of the breaker before any damage occurs to the drive system. Feed through the unit is stopped. When this occurs operations are temporarily halted and a rear hinged access door 40 is opened, the chain conveyor 32 is reversed, the loading hopper 24 is cleared, and the shear pin is replaced. The estimated downtime in this scenario is 20 minutes.

In a preferred embodiment, it is desirable that the feeder-breaker 22 have an throughput rate of 180 cubic yards per hour. A variable feed drive increases the throughput rate up to 250 cubic yards per hour. The feeder-breaker 22 is able to process material and construction debris with a nominal size of 6 inches×6 inches×6 inches with the capability to occasionally accommodate larger pieces. The breaker teeth bites debris up to one-half the breaker pick circle (½ of 28 inches =14 inches). It is desirable that the processed material have a nominal size of approximately 3 inches.

For example, one system design is electrically powered by a 150 horsepower (hp) 460 volts AC (VAC), breaker and hydrostatic pump drive capable of operating at 1800 rpm. To achieve a desired throughput of an average 180 cubic yards per hour requires the feeder-breaker 22 to utilize a 150 hp and the feed conveyor to utilize a 40 hp motor 34. Steelflex type coupling is used on the breaker with steel gear type couplings used on the hydraulic pump drive. The chain conveyor 32 has a width of 44 inches with head and tail shafts having a diameter between 3 and 4 inches. The breaker rotates in the direction of material flow and has an adjustable height setting. The breaker utilizes a relief shear pin hub in the breaker drive. The breaker shaft is constructed of solid steel and has a 5-inch diameter. A breaker shaft "cleaner" is installed for scalping tar from the breaker shaft. The breaker pick 28 has a circle diameter of 28 inches and utilizes replaceable pick type bits with carbide inserts. The structure's side members are constructed of 12 inch ship channel steel with a bed plate of 1-⅜ inches abrasive resistant mild steel on the intake end and 3-⅞ inches abrasive resistant mild steel under the breaker.

Feed Load Conveyor Assembly

It is the function of the feed conveyor assembly 30 to transfer the raw waste material from the feeder-breaker 22 to the weigh batch hoppers 42a and 42b. The material, as it is fed onto the feed load conveyor 26 is sized and the feed rate modulated. It is possible, at this point in the system, to have pieces of undesirable metal debris passing the feeder-breaker 22 which may damage mixer components. This material could include short pieces of pipe and reinforcing steel. An additional function of the feed conveyor assembly 30 is to detect metal and provide its segregation.

The feed load conveyor 26 is modified and configured to perform the following, (1) transfer waste from the feeder-breaker 22 to the weigh batch hoppers 42a and 42b, (2) detect the presences of metal debris and provide for passing this material into a metal debris bin 44, and (3) continuously alternate loading of parallel weigh batch hoppers 42a and 42b.

Figures 3B, 3C:
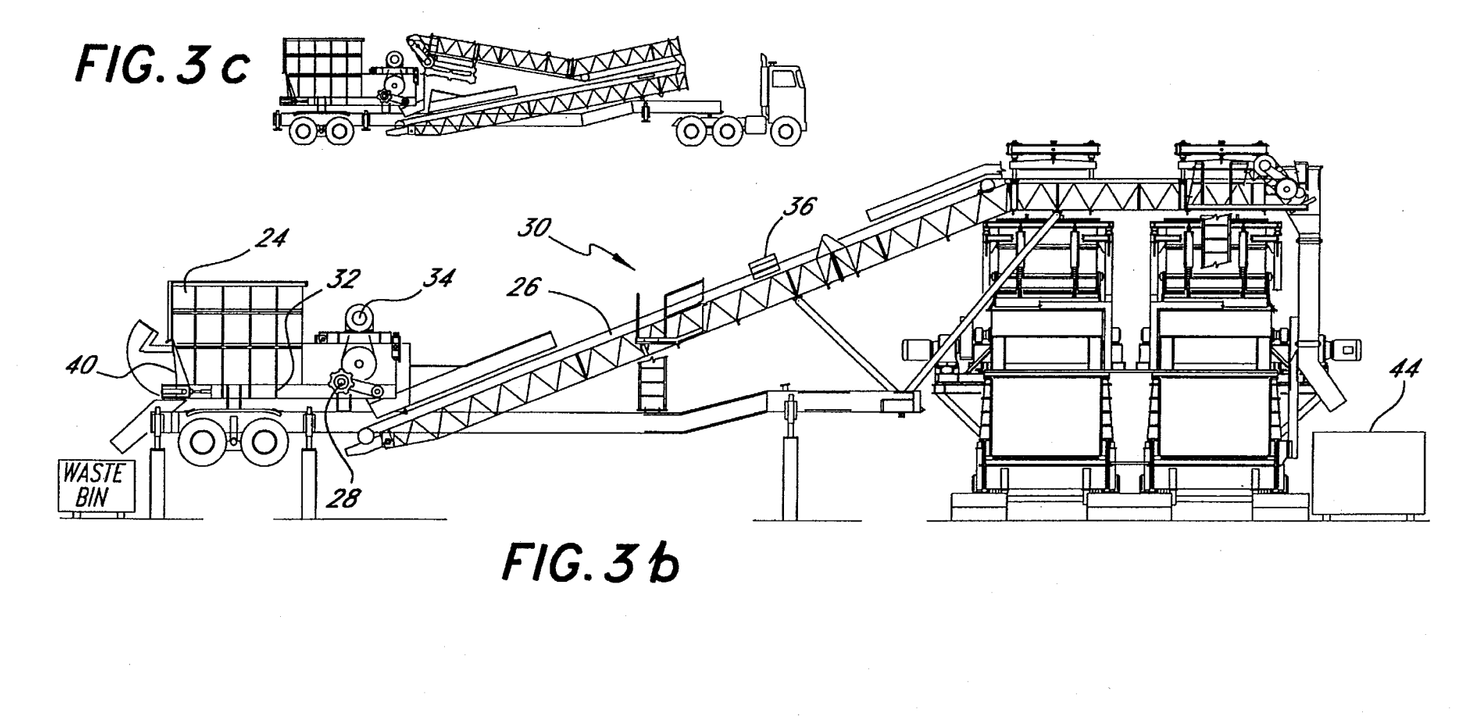
FIG. 3b is a top view of the portable material feeder in the presently preferred embodiment.
FIG. 3c is a side view of the material feeder in the transport position.

As shown in FIG. 3b, in operation, waste, sized and modulated by the feeder-breaker 22, is discharged onto the feed load conveyor 26. Side boards on the discharge end of the feeder-breaker 22 assure smooth placement of the waste on the center of the belt. The waste passes a tramp metal detector 36. The detector 36 has an adjustable sensitivity, field adjustable to detect metal debris that would damage the mixers. Detection of metal in the material causes both following plow gates 38 to open and allows the metal to fall into a metal debris bin 44. The waste is carried up the inclined trough portion of the feed load conveyor 26 onto the flat section where pneumatically operated plow gates 38 directs it into the appropriate weigh batch hopper.

Under normal operating conditions the rate of waste discharged onto the feed load conveyor 26 provides for continuous alternate loading each weigh batch hopper. The belt runs continuously, plow 38b is normally in a down position, while plow 38a alternately rises and falls to direct waste into the appropriate hopper until full. When metal debris is detected on the belt, both plows 38 rise to allow the metal to pass into the metal debris bin 44. (See plant system sequencing for details of sequencing timing)

In a preferred embodiment, for example, one system design has belt dimensions of 36 inches×70 feet and is electrically driven by a 40 hp motor. The feed load conveyer 26 is modified with an adjustable metal detector 36 and two pneumatically actuated plow gates 38a and 38b. The plows 38 and discharge chutes are removable for transportation.

In a highly preferred embodiment a Belt Feeder-Breaker by Stamler (Model BF-29-30-7F) is modified and used with a conveyor 26 modified to the specifications described above. The Stamler Feeder-Breaker is commonly used in the mining industry to crush rock materials to meet sizing requirements and provide for controlled feeding of sized material. As such, the system has a feeder-breaker 22 measuring 44 inches×15 feet and a conveyor 26 measuring 36 inches×70 feet. When configured on a single trailer unit as shown in FIG. 3c, the system has erected dimensions of 83 feet 6-⅝ inches while in operation, but folds down to 54 feet 5-½ inches for transport.

Reagent Feeder System

As shown in FIGS. 5a–d, the portable reagent feeder system comprises a small lime day tank 46, a hydrophobizing spray system, and two lime feeder systems. Each lime feed system comprises a horizontal auger 54, and an inclined, aero-mechanical conveyor 56.

Lime storage silos 50 feed the day tank 46 on demand, when activated by a low level indicator in the tank. The lime storage silos 50 are not part of the TTU and are normally purchased or rented separately.

The day tank 46 provides 30–60 minutes of surge capacity to the lime system, and provides a point 62 to apply the hydrophobizing reagent. As described above, one means to hydrophobized the lime is by spraying the quicklime with a hydrophobizing agent to delay hydration from occurring until sufficient mixing is achieved to predistribute the oil throughout the calcium oxide. Specifically, in the TTU the quicklime is hydrophobized as it is blown from storage silos 50 to the lime day tank 46. The lime is gravity fed into the horizontal screw augers 60, which volumetrically 54 meter the reagent. From the screw augers 60 the lime is fed into the inclined conveyer. The inclined conveyers, in high-speed intervals, feed measured amounts of lime into the lime bins of the weigh batch hoppers 42a and 42b.

The reagent feeder is designed to provide the following functions (1) modulate reagent feed to the weigh batch hoppers 42a and 42b, (2) provide for monitoring of mass of reagent fed to hoppers 42a and 42b (3) provide for dust free operation, and (3) provide for reagent hydrophobizing.

To accomplish these functions a 26 cubic yard day tank 46 with screw 60 and aero-mechanical conveyor 56 is placed on a single trailer unit. The unit is made up of a day tank 46 and dual feed conveyer systems.

Figure 4A:
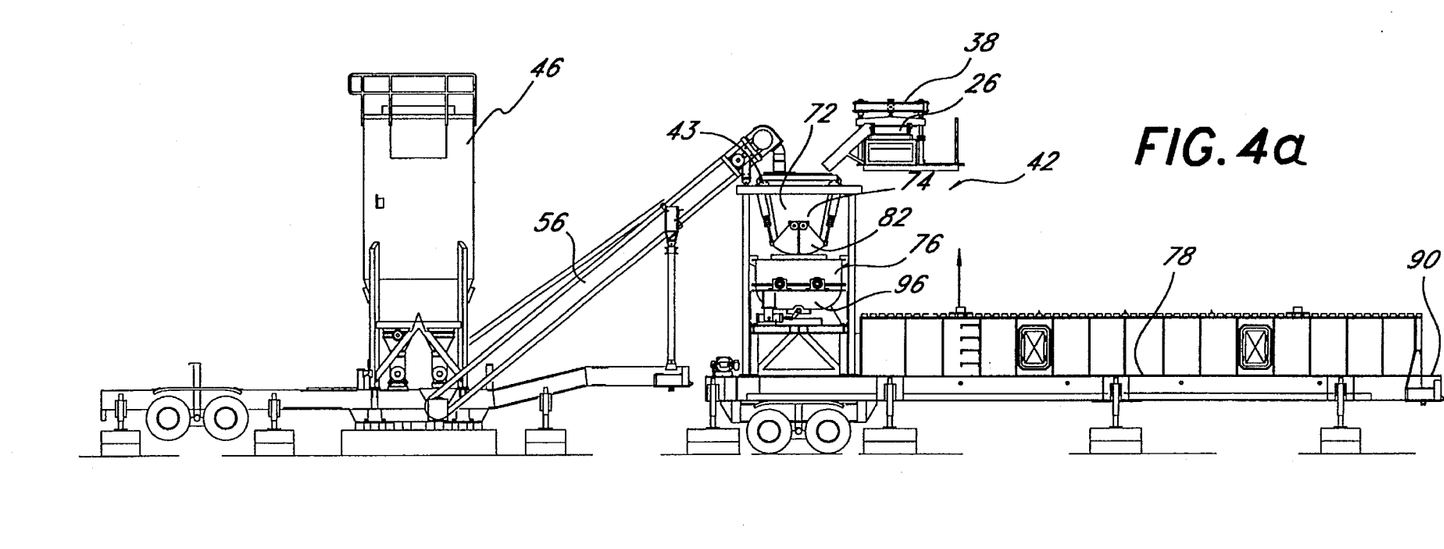
FIG. 4a is a side view of the portable material processor and portable reagent feeder in presently preferred embodiment.

Each feed system comprises of a horizontal screw auger 60 to meter reagent from the reagent day tank 52, and an aero-mechanical conveyor 56 to lift the reagent to the weigh batch hopper. The day tanks 46 are filled pneumatically, on demand, from lime storage vessels 50, and, meters reagent to the weigh batch hopper as required by the batching sequence. The reagent feeder unit is also designed to provide for reagent hydrophobizing as it is delivered to the day tank 46. The trailer configuration is shown in FIG. 4a. A detailed description of the major components follows.

Lime Day Tank

The day tank 46 functions to provide for intermediate storage and surge capacity between the bulk storage units and metered delivery to the weigh batch hopper. The day tank 46 provides has a nominal storage capacity for 26 cubic yards of reagent.

As shown in FIG. 5, the tank 46 is a silo design with an integral baghouse 48 to provide for dust free operation. Loading is accomplished pneumatically from single or dual feeder lines 64 from the bulk storage.

Pneumatic discharge line 64 at the day tank 46 is modified to accomplish introduction of a hydrophobizing agent as required. Details on the use of the hydrophobizing agent is disclosed below. The day tank 46 discharges through two hand operated shear gates 58 into horizontal volumetric screw augers 60.

For example, one preferred system design utilizes day tanks 46 with a 26 cubic yard working capacity. A baghouse 48 rated at 1800 cubic feet per minute (cfm) is pneumatically cleared and utilizes teflon coated bags. Preferably the dimension of the tank 46 are 8 feet 6 inches diameter by 22 feet 2 inches high.

Hydrophobizing System

The function of the hydrophobizing system is to introduce a liquid reagent into the quicklime as it is delivered to the day tank 46. This liquid reagent renders the quicklime hydrophobic, or water repelling, and retards the hydration reaction upon mixing with the waste.

Figures 5A, 5C:
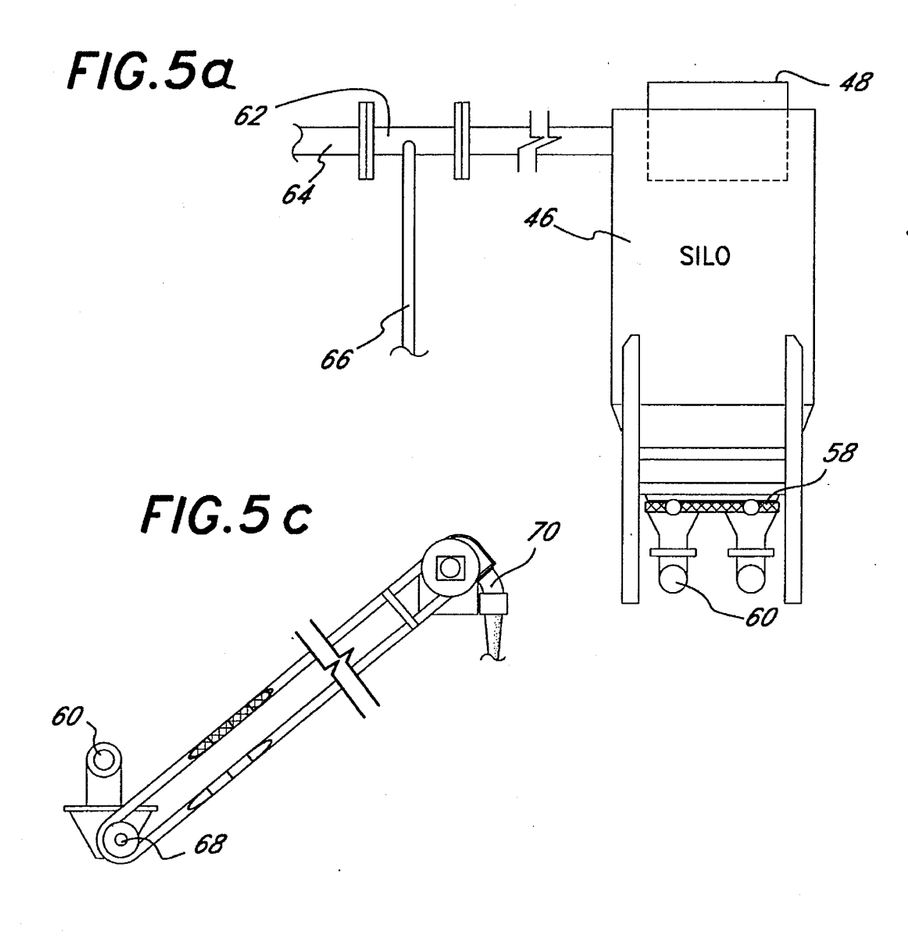
FIG. 5a is a schematic view of the hydrophobizing agent injection point at the day tank.
FIG. 5c is a schematic profile view of the screw augers associated with the day tank.

As shown in FIG. 5a, spray injector ports 62 are located in the pneumatic quicklime delivery line 64 between the lime storage tanks and the day tank 46. The spray heads are designed to deliver a 0.05% to 1% addition of hydrophobizing agent (by weight).

In operation, the hydrophobizing agent is a liquid and is stored in a bulk container adjacent to the quicklime storage tanks 50. The agent is pumped through a delivery line 66 by a positive displacement piston pump which meters the appropriate quantity to the injector 62 at the optimal injector operating pressure. The pumps are activated when the low level indicator in the lime day tank 46 activates the lime transfer system.

In a preferred embodiment, the agent is delivered in an airless spray at an application rate ranging from 1 to 5 gallons per minute, most preferably at 2.5 gallons per minute.

Screw Augers

The reagent day tank 52 discharges into two horizontal volumetric screw augers 60. These screw augers 60 meter reagent into the aeromechanical conveyors 56. Sensors monitoring auger screw rotation continuously provide reagent discharge information to the motor control center 94 (MCC) for integration into process control. The screw augers 60 operate intermittently as reagent is called for in the weigh batch hoppers 42a and 42b.

For example, one system design utilizes two variable pitch tubular screw augers 60 with a variable speed 5 hp drive motors with a capacity of 26 cubic feet per minute. The dimensions of such a system is 14 inches diameter by 6 feet.

Aero-Mechanical Conveyors

Figure 5B:
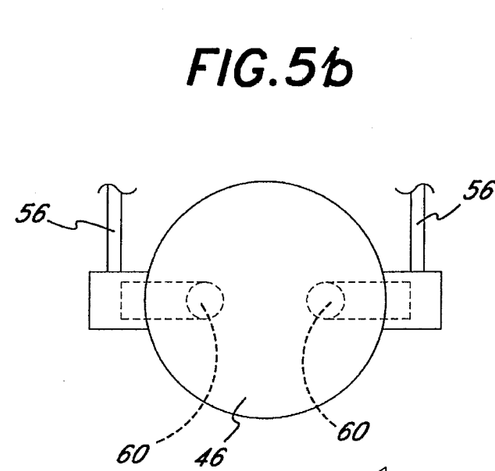
FIG. 5b is a schematic plan view of the screw augers associated with the day tank.
Figure 5D:
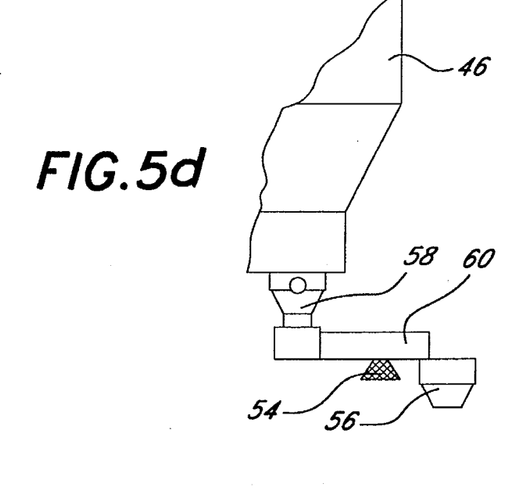
FIG. 5d is a schematic view of the aero-mechanical conveyor.

As shown in FIG. 5b-d, the aero-mechanical conveyors 56 rapidly transfer the metered reagent from the reagent tank 52 to the weigh batch hopper 42. It is desirable that this transfer is made rapidly to maintain minimum batch cycle times and thus maximize TTU throughput.

The aero-mechanical conveyors 56 are tubular in shape and operates at a high rates of speed to convey free flowing materials through steel tubes using a rope and disc assemblies. The discs are equally spaced on a wire rope that travels at very high rates of speed within the tubes and essentially fluidizes the material being conveyed.

At the suction end 68 of the unit material is drawn into the conveyor 56 by gravity and centrifugally thrown into the air stream created by the rope and discs traveling through the tubes. The material is carried up the tube between the impeller-like discs. At the discharge end 70 material is thrown free of the discs and out of the conveyor.

The aero-mechanical conveyors 56 on the reagent tank 52 operate continuously, and convey reagent when the MCC activates the screw augers 60.

In the preferred embodiment, the aero-mechanical conveyors 56 are dimensioned with 5 inches tubes, and lengths of 32.5 feet and 35 feet and utilize a 10 hp motor. The nominal capacity rate is 26 cubic feet per minute, with a variable range of 4 to 100 cubic feet per minute depending on the material.

Figure 4B:
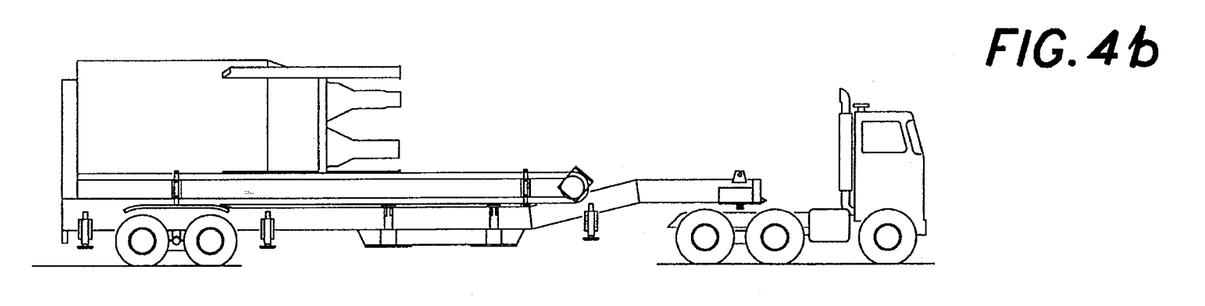
FIG. 4b is a view of the reagent feeder in the transport position.

When configured on a single trailer unit as shown in FIG. 4b, the reagent feeder system has dimensions of 52 feet 6 inches when erected for operation, but folds down to 44 feet 2 inches for transport.

Portable Material Processor Units

Both of the TTU portable material processor units are identical and comprise a weigh batch hopper, a high intensity shear mixer, and a walking floor conveyor. The material feeder is designed to provide the following functions; (1) receive and monitor proportioning of reagent (i.e. hydrophobized quicklime) and waste in weigh batch hopper, (2) discharge properly proportioned waste and reagent together or sequentially, first waste then reagent into mixer, (3) intensively mix waste, water and reagent, (4) discharge mixed waste into reaction chamber 84 where mixed material is held for up to 30 minutes while exothermic reaction takes place, (5) contain dust and fumes, and (6) discharge treated material onto stacking conveyor.

The system is designed to operate two batch processors in an alternating, parallel manner. Either unit may be locked-out for maintenance or repairs, while the other unit remains in operation. Normally, both material processor units operate in parallel.

The material processor trailer configuration is shown in FIG. 4a. A detailed description of the system components follows.

Weigh Batch Hoppers

Each weigh batch hopper 42 has separate lime bin 72 and raw waste bin 74 and is fed by the reagent conveyer 56 and raw waste feed load conveyor 26. The weigh batch hopper 42 measures the correct lime/waste treatment ratio. Constructed with steep walls, and lined with UltraHigh Molecular Weight plastic to prevent sticking, it feeds directly into a mixer 76 setting below. Two clam shell gates 82 control discharge into the mixer 76. The gates 82 are opened either simultaneously; or, to release waste into the mixer before the lime, sequentially.

The weigh batch hoppers 42a and 42b receive waste from the material load feeder 26 and reagent from the reagent conveyer 56, and discharge the properly proportioned material into the mixers 76. Discharge from the hoppers 42 is made With reagent and waste simultaneously or sequentially. The hopper is set on load cells 43 to continuously measure the lime and waste. The reagent is segregated from the waste in the hopper 42 by a baffle to prevent interaction until rapid and complete mixing occurs. The reagent side of the hopper is enclosed and attached to the emissions control system 86 for dust free operation.

Figure 6A:
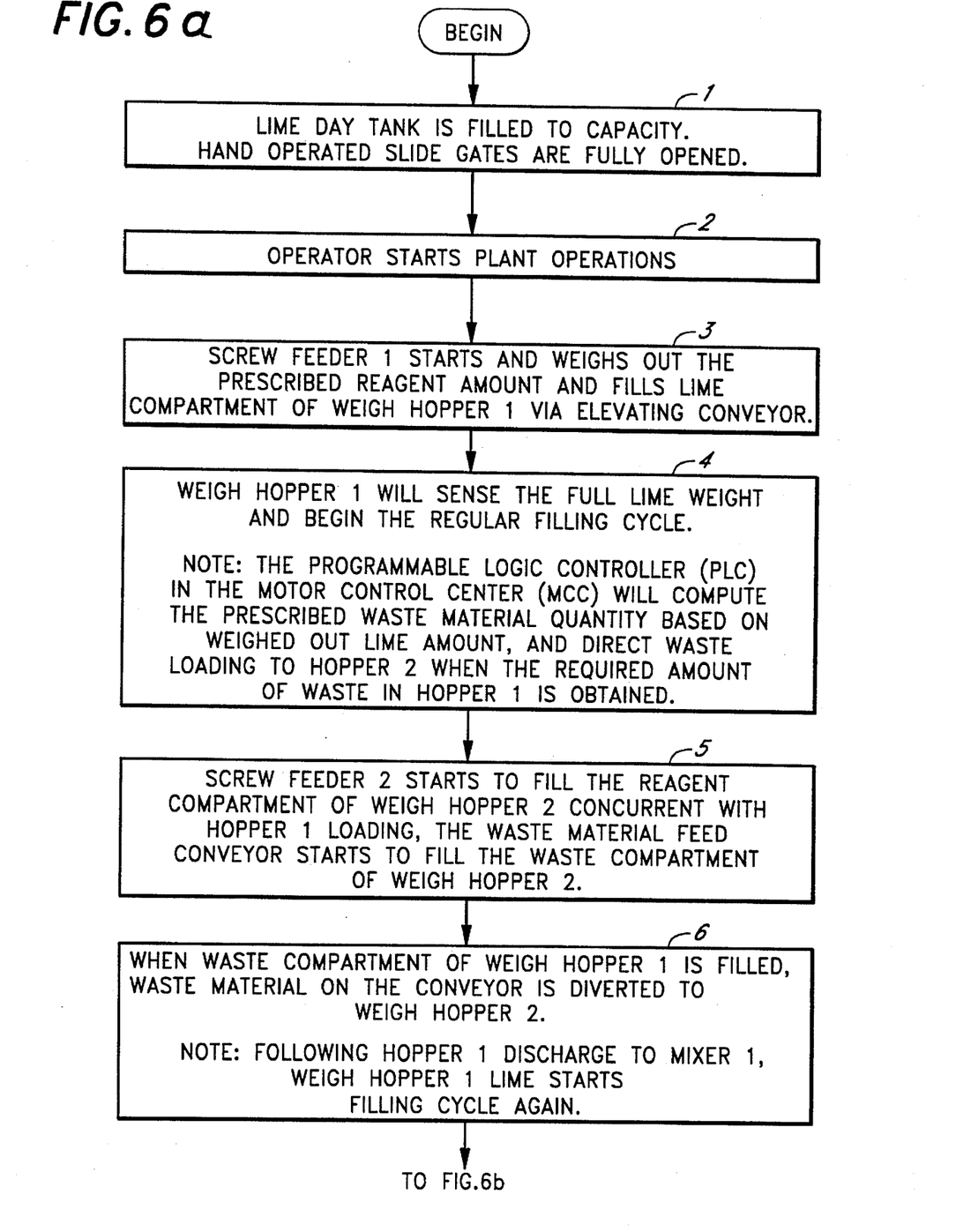
FIG. 6 is a flow diagram showing the plant operating sequence.
Figure 6B:
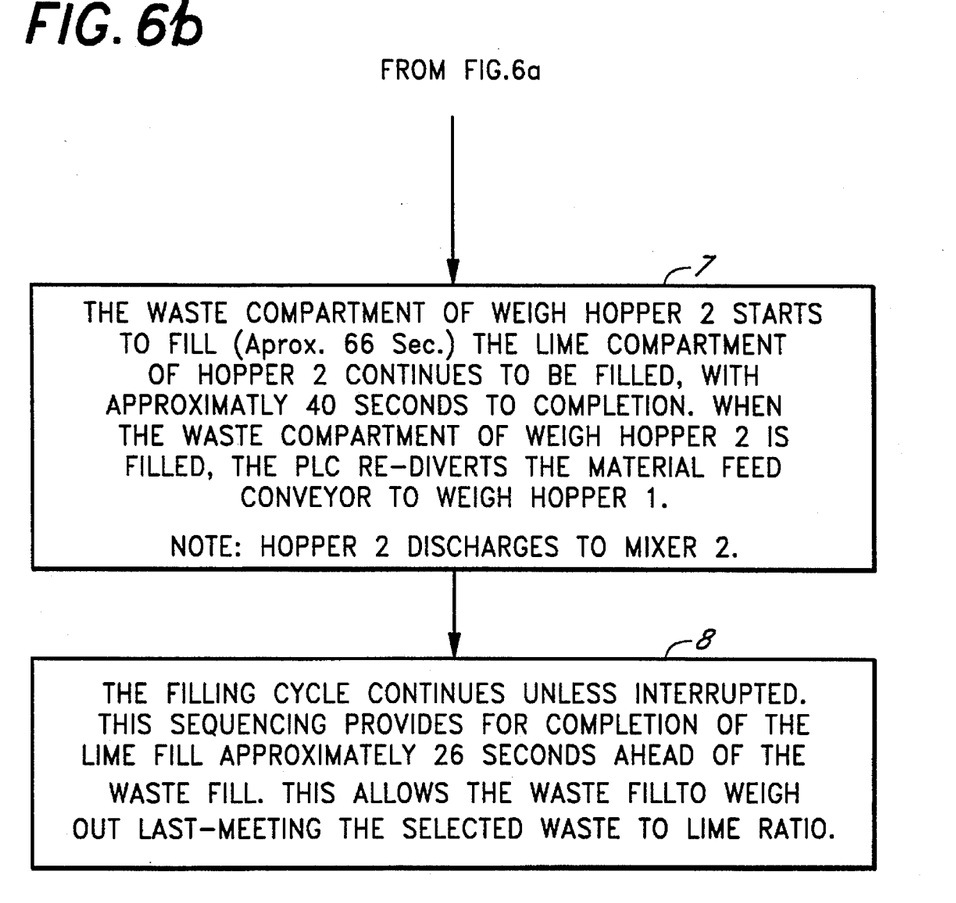

In operation, the hopper load cells 43 continuously measure waste and lime mass. When predetermined set points are reached the waste is discharged. The gates on the hopper are operated separately to provide for sequential discharge if called for by the MCC. FIGS. 6a and 6b provides a description of the operational sequencing steps.

In the preferred embodiment, the weigh batch hoppers 42a and 42b have a nominal reagent capacity of 1.5 cubic yards and a nominal waste capacity of 3.28 cubic yards. The batch hoppers 42a and 42b are dimensioned to have an overall height of 6 feet 6 inches (top of mixer to top of hopper), and overall width of 5 feet (top inside) and an overall length of 7 feet (top inside). Preferably, the actuators are pneumatically operated cylinders capable of operating each gate independently, the cylinder length being 3 feet 4 inches when retracted and 5 feet 1 inch when extended. The hopper interior is lined with Ryerson UHMW Polyethylene and a ⅜-inch liner plate of TIVAR 88.

Mixers

The function of the mixers 76 is to homogenize the waste and reagent in a batch mix mode. The mixers 76 must be robust in construction and provide for rapid and aggressive homogenizing with high reliability.

Each mixer 76 blends raw waste, water, and reagent into a homogeneous mixture. The amount of reagent and water added to each batch, as well as cycle time, varies with waste composition. Reagent is added, of course, to stabilize the waste, while water is added to control its moisture content. After blending, the mixture is dropped onto the walking floor 78 below.

High intensity mixers-are required for this use. Widely used in the construction industry for production of no-slump concrete, the mixers 76 are manufactured to mix heavy abrasive aggregates. The units are operated by dual 75 hp electric motor drives and gear reducers designed for "severe duty" outdoor service. The drive system is sized for 24 hr continuous operations.

The mixers 76 are geared to operate at a high rpm setting (75 rpm) and are controlled by electric variable frequency controllers to provide for operator controlled increase and/or decrease in rpm.

The mixers 76 are configured for batch operation, with one full width pneumatically operated discharge gate 96 across the bottom of the unit. The discharge gate 96 is watertight.

Under normal operating conditions the weigh batch hopper 42 discharges waste, reagent and water simultaneously into the mixer 76. Of course, the materials may also be added sequentially. The mixer blades rotate continuously as the material pours in. Once loaded the mixer 76 continues to mix for a preset period. When the mixing cycle is over, the discharge gate 96 opens. Again, the mixer blades continue to rotate through the discharge cycle, effectively cleaning out the mixer.

In a preferred embodiment, for example, the mixer box has dimensions (L) 7 feet 11 inches× (W) 6 feet 9 inches× (H) 5 feet 5 inches, weighs 22,260 pounds, and has rated capacity of 3.28 cubic yards. The unit is driven by two (2) 60 hp electric gear motor drives. Motors are 4 pole, TEFC and are equipped with concentric configuration Dodge or equal gear reducers rated for "severe duty" in outdoor service. The drive includes inline flex couplings and all drive systems are sized for 24 hour per day application. The motor base is designed to provide for high torque mixer starting. The mixer body is constructed of heavy gauge fully welded steel with cast, high alloy mixing blades. Body, shaft and discharge gates are protected with replaceable, bolted in, high alloy cast wear liners.

In a highly preferred embodiment a twin Shaft Heavy Duty Concrete Mixer by NIKKO SF2500DH is found to achieve desirable results.

Reaction Chambers

The walking floor 78 receives batch mixtures which are just beginning to hydrate. The walking floor 78 is a conveyer, which when enclosed forms the reaction chamber 84 to allow up to 30 minutes or more of retention time for the hydration reaction to occur and to allow temperatures to reach maximum levels. The enclosed walking floor 78 operates at a slight vacuum to capture and vent dust and organics to the emissions control system 86. Because of the exothermic hydration reaction, the typical operating temperature is expected to range between 160° and 170° F. However, to control hot spots and suppress fires, the walking floor 78 is equipped with a staged sprinkler system.

The reaction chamber 84 retains the mixed waste and reagent to allow completion of the hydration reaction. During this time the temperature of the reaction approaches or exceeds boiling and generates some quantity of steam and volatile emissions. These emissions are contained within the chamber 84 and drawn off by the emissions control system 86.

To provide for the required reaction chamber retention time, the material is discharged onto a walking floor conveyor. The reaction chamber 84 walking floor 78 has a length of 48 feet and design operating speed of 1.5 feet per minute (floor hydraulic drive is variable speed). This provides for 30 minutes of retention time for material discharged onto the floor 78. The floor 78 is hydraulically driven with variable speed drive system to provide for adjustable retention time. The floor 78 discharges onto a collecting conveyor which carries the material away from the unit.

In a preferred embodiment, for example, the walking floor conveyor 78 has dimensions of 8 feet 9 inches×48 feet. Design loading on the floor is 230,000 pounds. The typical operating temperature is expected to range between 160° and 170° F. The floor speed is variable, but desirable results are obtained at 1.5 feet per minute. The material retention time on the floor is variable depending on the floor speed, however, at 1.5 feet per minute retention time is approximately 30 minute. The walking floor conveyor is powered by a 60 hp electric motor with hydraulic over drive. The working surfaces of the walking floor is constructed out of carbon steel and is sealed. In a highly preferred embodiment a walking floor by Keith Mfg. Co. is found to achieve desirable results.

When configured as describe above, each material processor unit achieve a throughput of 3.28 cubic yards per cycle per processor, or approximately 90 cubic yards treated, waste per hour at 2.2 minute per batch cycle. When configured on a single trailer unit as shown in FIG. 4a, the system has erected dimensions of 56 feet 4 inches while in operation, but folds down to 55 feet for transport.

Radial Stacker

The radial stacker 88 receives treated waste from the material processing collecting conveyor and delivers it to a stockpile. Preferable, the radial stacker 88 has dimensions of 24 inches×70 feet, utilize a 20 hp transverse drive, with a load capacity of 400 tons per hour and a nominal belt speed of 250 feet per minute (fpm) nominal and 350 fpm max.

A collecting conveyer 90 common to both walking floors 78 collects the treated waste and feeds a radial stacker 88. The radial stacker 78 discharges the treated waste into a stockpile 92 for later landfill disposal. The radial stacker 88 is not part of the TTU, and is typically purchased or rented.

Emissions Control System

The TTU is designed with three emissions controls systems 86 to reduce particulates and organic vapors to acceptable levels. The TTU itself contains five main sources of emissions: the lime day tank 46; both weigh batch hopper and mixer assemblies; and both walking floor conveyors. The lime storage, which is separate from the TTU, is excluded as a source of emissions since the lime storage tanks 50 normally share a common baghouse.

Emissions from these separate sources are not commingled and handled in a single emissions control system. Rather, dust, steam and organic vapors are treated separately, with the equipment described below.

The dust load at the day tank 46 is caused by the intermittent blowing of lime into the day tank 46. The day tank 46 is equipped with a baghouse 48, which uses a filter specifically chosen for the hydrophobized lime.

The weigh batch hoppers 42a and 42b and mixers are the main sources of dust, primarily hydrophobized lime, in the TTU. Dust is generated each time air is displaced during the loading cycles of the hoppers 42a and 42b and mixers. Dust is vented off of the lime dust bins (which are enclosed) and the mixers into a hydrostatic precipitator.

The hydrostatic precipitator removes dust from air by mixing dust with water using impellers. The dust, separated from the air by a combination of impingement and centrifugal force, is discharged from the unit as a slurry for disposal. Clean air from the system is routed through a carbon filter (discussed in the following paragraphs), even though its organic vapor content is normally nil.

Steam and organic vapors is released in the walking floors as reagent in the waste reacts. The walking floors, which are enclosed, vent to a spray tower. The spray tower works in conjunction with an in-line heater to dehumidify the air to allow filtering through a carbon filter.

Although the primary purpose of the spray tower is heat removal by steam condensation, as a side benefit, it also condenses a large fraction of the organics, and removes 99$^+$% of any dust in the vapor. The concentration of organics and dust coming off of the walking floors is very small. Saturated, dust-free air coming off of the spray tower is heated to about approximately 150° F. with a relative humidity less than 50%, and filtered through activated carbon to remove trace organics.

The system is sized to handle up to 5000 scfm entrained air; however, the actual amount of air that actually infiltrates the system (i.e., the weigh batch hoppers 42a and 42b, mixers, and walking floors) is normally much less. To maintain a pressure balance within the emissions control system, only the amount of air infiltrating into the system is vented through the carbon filter to atmosphere. Using a series of blowers and dampers, the remainder of the air is recirculated through the system, maintaining a slight vacuum on the walking floors to prevent fugitive emissions.

The emissions control system contains dust, steam and organic emissions generated by the process equipment. The system is divided into two subsystems to address dust generated from reagent transfer and mixing operations, and to address steam and organic vapors generated by the exothermic hydration reaction.

Dust Control

Dust is generated during weigh batch hopper filling and in hopper discharge to the mixer. To reduce fugitive dust emissions, it is necessary to draw a slight vacuum on the mixer and weigh batch hopper. The air stream drawn from these units is passed through a hydrostatic precipitator.

The hydrostatic precipitator removes potentially high dust loadings from the air vented from the weigh batch hoppers 42a and 42b and mixers. The precipitator has a high dust removal capacity. Dust is separated from the air by impinging dust and water on an impeller, then dust is discharged from the unit as a slurry. After the precipitator has removed the dust from the air stream, the stream is recirculated back to the mixers and hoppers 42a and 42b, creating an enclosed system. Infiltration into the system is balanced by a ducted connection to an activated carbon adsorber unit.

In a preferred embodiment, for example, one system design utilizes a type N Rotoclone hydrostatic precipitator by American Air Filter with dimensions of (L) 4 feet 4 inches × (W) 5 feet 1 inches × (H) 8 feet 7 inches. The hydrostatic precipitator has an operating weight of 2600 pounds. The system has an exhaust capacity of 5000 scfm, 15 inches wc when utilizing a 5 hp monarch pump and a 15 hp blower with centri exhaust.

Steam and Organic Vapor Control

Steam and organic vapors are generated by the hydration reaction of the mixed reagent and waste. This occurs while the materials pass through the walking floor conveyor reaction chamber 84. Reaction temperatures generally reach maximums of 160° to 212° F.

Steam and vapors generated in the chamber 84 are drawn off and passed through a partially packed spray tower. The function of the spray tower is to cool the gas stream, condensing the steam to water vapor. The air stream passing through the tower is recirculated to the reaction chamber units 84. Infiltration into the system is drawn off to an activated carbon adsorber. Both the dust system and steam/organic vapor system are recirculating systems with infiltration into the systems discharged to the atmosphere after passing through activated carbon. Testing may determine that direct discharge is possible.

A spray tower is used to collect dust and condense steam and organics vented off of the walking floors. The bottom of the tower is packed.

In a preferred embodiment the tower is constructed of UV black polypropylene having dimensions of (H) 20 feet × diameter 48 inches. The weight of the tower is approximately 3000 lbs. The bottom of the tower is packed to a 10 feet height with Tri-Packs by Tri-Mer Corp. The tower utilizes a 20 hp Pump, operating at 3600 rpm and a 10 hp industrial exhauster blower.

A carbon adsorber is used to remove volatile organics from air vented from the walking floors and the rotoclone. Air is heated by an electrical heater to reduce the relative humidity to approximately 50%, then drawn through the filter and vented to atmosphere.

In a preferred embodiment the adsorber has a nominal capacity of 5000 scfm and has a carbon charge of 12,000 pounds. It is able to operate in temperature conditions of 130°–170° F. The adsorber utilizes a 30 kw preheater and 3 hp industrial exhaust type blower.

TTU Capacity Estimates

TTU throughput is effected by several variables involving equipment and field operations, such as material feed rate, feeder-breaker rate, mixer cycle time, and lime feeder rate. Changes in equipment configuration or settings and/or increases in operational efficiencies can increase unit throughput. The variables and effects on throughput effects resulting from changes to material feed, feeder-breaker, mixer cycle time, lime feeder are discussed below.

With regard to material feed rate, a standard equipment loading rate is 180 cu yds/hr. This rate requires use of a tracked hydraulic excavator with a 2.6 cu yd bucket and an operator efficiency of 60%. Increasing bucket size and/or operator efficiency correspondingly effect headwork loading rate and plant throughput.

With regard to the feeder-breaker rate, the feeder-breaker 22 with delivered breaker settings produces up to 250 cu yds/hr. Changes in these settings may potentially double its capacity. However, material size to the mixer increases correspondingly.

With regard to the mixer cycle time, the preferred design cycle time is 2.2 min/cycle. This assumes a mix time of 90 sec/cycle. For some material, the mixing times may be less. Reducing cycle time by 30 seconds (23%) increases plant throughput to 231 cu yds/hr, an increase of approximately 30%.

With regard to the lime feeder rate, the design lime transfer rate from the day tank to the feed hopper is 26 cfm. At the design cycle time, this provides 1840 lbs/cycle, or a 20% reagent:waste addition. Some wastes require less lime, and thus shorten lime transfer time and corresponding cycle times. As indicated above reductions in cycle time yield corresponding increases in throughput.

Motor Control Center

The motor control center (MCC) 94 monitors, controls and integrates operation of all TTU systems. The MCC 94 occupies a 40 foot truck trailer and include power and control electrical equipment. The MCC 94 also houses the operators control room.

Control and instrumentation is based around a Programmable Logic Controller (PLC) and an industrial AT type computer terminal machine-man interface. The PLC provides for monitoring all primary plant functions and outputting data for monitor, control and reporting.

Power to each TTU unit is provided for from the MCC 94. The MCC 94 is connected to a single power source on site, and it provides connections for emergency power. The MCC is designed and situated on site so as to provide the control room operator with maximum visibility.

Process Control

In order to optimize throughput in the TTU dual batch mixer design, a sequencing batch system is used. As shown in the Control Sequence Timing Table below, in a sequencing batch design the loading and discharge cycles for each mixer overlap. This overlapping creates the outward appearance of a continuous flow-through system, as the feeder/breaker, feed conveyor and discharge conveyor continuously convey material to and away from the TTU. Cycle times for each mixer operation are determined by the certain variables discussed below.

The first variable is the mixing time required to thoroughly homogenize a particular waste with the reagent. For example, the treatment of the various wastes such as contaminated soils and tar, treatment times vary from 30 seconds to 120 seconds. The average treatment time is approximately 90 seconds.

The second variable to consider is the weigh batch hopper discharge time. The weigh batch hopper can discharge all of its contents at once, or, sequentially discharge waste then reagent. It may be useful, when treating certain wastes, to first discharge waste and homogenize it with water prior to adding the reagent.

The third variable is the physical limitations of equipment throughput rates. In the preferred embodiments, the treatment systems is sized to easily accommodate the estimated average feed rate of 180 yards per hour. Using this rate and using the estimated average mixing time of 90 seconds the following equipment activity cycle was developed. This cycle is described in the Control Sequence Timing Table.

In considering the above variables, specific control loops are designed to provide protection of personnel and equipment from process upsets, mechanical failures, or human errors; while simultaneously maximizing TTU throughput and meeting performance specifications.

| CONTROL SEQUENCE TIMING TABLE | | |
|---|---|---|
| Elapsed Time (sec) | Activity Time (sec) | Activity |
| 0 | 0 | Initial conditions: |
| | | Weigh Batch Hopper 1 & 2 lime full |
| | | Weigh Hopper 1 & 2 waste empty |
| | | Mixer 1 & 2 empty |
| 0–66 | 66 | Load waste in Weigh Hopper 1 |
| 66–87 | 21 | Load Mixer 1 |
| 66–132 | 66 | Load waste in Weigh Hopper 2 |
| 87–177 | 90 | Mix in Mixer 1 |
| 87–172 | 85 | Load lime in Weigh Hopper 1 |
| 132–198 | 66 | Load waste in Weigh Hopper 1 |
| 132–153 | 21 | Load Mixer 2 |
| 153–243 | 90 | Mix in Mixer 2 |
| 153–238 | 85 | Load lime in Weigh Hopper 2 |
| 177–198 | 21 | Discharge Mixer 1 |
| 198–219 | 21 | Load Mixer 1 |
| 198–264 | 66 | Load waste in Weigh Hopper 2 |
| 219–309 | 90 | Mix in Mixer 1 |
| 243–264 | 21 | Discharge Mixer 2 |
| 264–285 | 21 | Load Mixer 2 |

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A unit for treating hydrocarbon contaminated soil and sludge waste material using exothermic stabilization processes, the unit comprising:

a weigh batch hopper divided into a first bin for holding waste material and a second bin for holding reagent so that the waste material and reagent can be dispensed simultaneously or sequentially;

breaking means for receiving waste material and reducing solids in the waste material to a maximum dimension of four inches;

first conveying means for transferring the waste material from the breaking means to the first bin of the weigh batch hopper;

reagent storage tanks for storing reagent;

second conveying means for transferring the reagent from the reagent storage tanks to the second bin of the weigh batch hopper;

mixing means for receiving batches of the waste material and the reagent from the weigh batch hopper and for mixing water, the waste material and the reagent together;

a walking floor conveyor for receiving and transferring a mixture of the waste material and the reagent discharged from the mixing means without further mixing and holding the batches a sufficient time for a reaction between the reagent and the waste material to be completed; and third conveying means for transferring the mixture received from the third conveying means to a stockpile for processed material.

2. The unit of claim 1 further comprising:

a plurality of weigh batch hoppers; and gating means for directing the waste material to provide for continuous alternate loading of the weigh batch hoppers.

3. The unit of claim 1 wherein the first conveying means further comprises:

detecting means for detecting the presence of metal debris in the waste material; and segregating means for segregating the metal debris from the waste material.

4. The unit of claim 1 wherein the second conveying means comprises a horizontal auger and an aero-mechanical conveyer.

5. The unit of claim 1 further comprising:

a lime storage tank for storing lime;

a hydrophobizing agent storage tank for storing hydrophobizing agent;

means for transferring lime from the lime storage tank to the reagent storage tank; and means for introducing the hydrophobizing agent into the lime prior to the lime reaching the reagent storage tank.

6. The unit of claim 1 wherein the second bin is enclosed and attached to an emissions control system to reduce dust emissions.

7. The unit of claim 1 further comprising a first emission controlling means for controlling particulate emissions generated from operating the unit.

8. The unit of claim 7 wherein the first emission control means comprises:

drawing means for drawing an airstream from the mixing means and the weigh batch hopper;

a hydrostatic precipitator for receiving the airstream, mixing it with water and removing dust from the airstream;

a discharge means for discharging the removed dust as a slurry; and means for recirculating the airstream back to the mixing means and the weigh batch hopper.

9. The unit of claim 1 further comprising a second emission controlling means for controlling vapor emissions generated from operating the unit.

10. The unit of claim 9 wherein the second emission control means comprises:

a venting means to vent steam and organic vapors released by the reaction between the reagent and the waste to a spray tower;

an in-line heater to dehumidify the vapors in the venting means; and filter means for receiving the vapors from the venting means and removing trace organics.

11. The unit of claim 1 comprising a plurality of weigh batch hoppers, a plurality of reagent storage tanks, a plurality of second conveying means, a plurality of mixing means, and a plurality of walking floor conveyor means, wherein the weigh batch hoppers, the plurality of reagent storage tanks, the plurality of second conveying means, the plurality of mixing means, and the plurality of walking floor conveyor means operate in a parallel batch sequencing fashion.

12. A unit for treating hydrocarbon contaminated waste material using a reagent in an exothermic stabilization process, the unit comprising:

breaking means for receiving the waste material and reducing maximum dimensions of solids in the waste material;

mixing means for mixing the waste material, the reagent and water together;

an enclosed reaction chamber including a walking floor conveyor to retain the mixed reagent and waste material until the reaction between the mixed reagent and waste material is complete and for moving the mixed reagent and waste material to a discharge port; and an emission controlling means for controlling vapor emissions generated by the reaction between the mixed reagent and waste material.

13. The unit of claim 12 wherein the emission controlling means comprises:

venting means to vent steam and organic vapors released by reaction between the mixed reagent and waste material to a spray tower;

an in-line heater to dehumidify the vapors in the venting means; and filter means for receiving the vapors from the venting means and removing trace organics.

14. The unit of claim 12 further comprising:

lime storage tanks for storing lime;

a weigh batch hopper for holding the waste material and lime prior to discharge into the mixing means;

first conveying means for loading the waste material into the weigh batch hopper;

second conveying means for transferring the lime from the lime storage tanks to the weigh batch hopper; and means for introducing a hydrophobizing agent into the lime prior to the lime reaching the weigh batch hopper.

15. A unit for treating hydrocarbon contaminated waste material using a reagent in an exothermic stabilization process, the unit comprising:

mixing means for mixing the waste material, the reagent and water together; and an enclosed reaction chamber to retain the waste material until the reaction between the mixed reagent and waste material is complete, the reaction chamber comprising:
  an input position for receiving the mixed reagent and waste material from the mixing means;
  a discharge position for discharging the mixed reagent and waste material from the reaction chamber; and
  a walking floor conveying means to transport the mixed reagent and waste material from the input position to the discharge position at a rate sufficient for reaction within the mixed reagent and waste material to be completed before reaching the discharge position.

16. The unit of claim 15 further comprising an emission controlling means comprising:
  venting means to vent steam and organic vapors released by reaction between the reagent and the waste material to a spray tower;
  an in-line heater to dehumidify the vapors in the venting means; and
  filter means for receiving the vapors from the venting means and removing trace organics.

17. The unit of claim 16 further comprising:
  lime storage tanks for storing lime;
  a weigh batch hopper for holding the waste material and the lime in separate compartments prior to simultaneous or sequential discharge into the mixing means;
  first conveying means for loading the waste material into the weigh batch hopper;
  second conveying means for transferring the lime from the lime storage tanks to the weigh batch hopper; and
  means for introducing a hydrophobizing agent into the lime prior to the lime reaching the weigh batch hopper.

18. A unit for treating contaminated soil and sludge waste material using exothermic stabilization processes, the unit comprising:
  a weigh batch hopper;
  breaking means for receiving waste material and reducing solids in the waste material to a maximum dimension of four inches;
  first conveying means for transferring the waste material from the breaking means to the weigh batch hopper;
  reagent storage tanks for storing reagent;
  a lime storage tank for storing lime, the lime storage tank also including:
    a hydrophobizing agent storage tank for storing hydrophobizing agent;
    means for transferring lime from the lime storage tank to the reagent storage tank; and
    means for introducing the hydrophobizing agent into the lime prior to the lime reaching the reagent storage tank;
  second conveying means for transferring reagent from the reagent storage tanks to the weigh batch hopper;
  mixing means for receiving the waste material and the reagent from the weigh batch hopper and for mixing water, the waste material and the reagent together;
  third conveying means for receiving and transferring a mixture of the waste material and the reagent discharged from the mixing means; and
  fourth conveying means for transferring the mixture received from the third conveying means to a stockpile for processed material.

19. A unit for treating contaminated waste material using a reagent in an exothermic stabilization process, the unit comprising:
  lime storage tanks for storing lime;
  mixing means for mixing the waste material, the lime and water together;
  first conveying means for loading the waste material into the mixing means;
  second conveying means for transferring the lime from the lime storage tanks to the mixing means;
  means for introducing a hydrophobizing agent into the lime prior to the lime reaching the mixing means;
  an enclosed reaction chamber to retain the waste material until the reaction between the mixed reagent and waste material is complete, the reaction chamber comprising:
    an input position for receiving the mixed reagent and waste material from the mixing means;
    a discharge position for discharging the mixed reagent and waste material from the reaction chamber; and
    third conveying means to transport the mixed reagent and waste material from the input position to the discharge position at a rate sufficient for reaction between the mixed reagent and waste material to be completed before reaching the discharge position; and
  an emission controlling means comprising:
    venting means to vent steam and organic vapors released by reaction between the reagent and the waste material to a spray tower;
    an in-line heater to dehumidify the vapors in the venting means; and
    filter means for receiving the vapors from the venting means and removing trace organics.

20. A unit for treating contaminated waste material using a reagent in an exothermic stabilization processes, the unit comprising:
  breaking means for receiving the waste material and reducing maximum dimensions of solids in the waste material;
  lime storage tanks for storing lime;
  mixing means for mixing the waste material, the lime and water together;
  a weigh batch hopper for holding the waste material and lime prior to discharge into the mixing means;
  first conveying means for loading the waste material into the weigh batch hopper;
  second conveying means for transferring the lime from the lime storage tanks to the weigh batch hopper;
  means for introducing a hydrophobizing agent into the lime prior to the lime reaching the weigh batch hopper;
  an enclosed reaction chamber to retain the mixed lime, water and waste material until the reaction between the lime and waste material is complete, the reaction chamber comprising:
    an input position for receiving the mixed lime and waste material from the mixing means;
    a discharge position for discharging the mixed reagent and waste material from the reaction chamber; and
    third conveying means to transport the mixed lime and waste material from the input position to the discharge position at a rate sufficient for reaction between the mixed reagent and waste material to be complete between the input position and the discharge position; and
  an emission controlling means for controlling vapor emissions generated by the reaction between the mixed reagent and waste material.

* * * * *